United States Patent
Shearman et al.

(10) Patent No.: US 9,729,432 B2
(45) Date of Patent: Aug. 8, 2017

(54) DIFFERENT FORWARDING OF PACKETS BASED ON WHETHER RECEIVED FROM A CORE OR CUSTOMER NETWORK

(71) Applicants: Robert J. Shearman, Newbury (GB); Neale David Raymond Ranns, Basingstoke (GB); Crispin Nicholas Dent-Young, Bristol (GB); Alan J. Cheilek, London (GB)

(72) Inventors: Robert J. Shearman, Newbury (GB); Neale David Raymond Ranns, Basingstoke (GB); Crispin Nicholas Dent-Young, Bristol (GB); Alan J. Cheilek, London (GB)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 14/952,249

(22) Filed: Nov. 25, 2015

(65) Prior Publication Data
US 2017/0149657 A1 May 25, 2017

(51) Int. Cl.
*H04L 12/28* (2006.01)
*H04L 12/725* (2013.01)
(Continued)

(52) U.S. Cl.
CPC .......... *H04L 45/306* (2013.01); *H04L 45/586* (2013.01); *H04L 45/745* (2013.01)

(58) Field of Classification Search
CPC ....... H04L 45/18; H04L 45/22; H04L 45/306; H04L 45/308; H04L 45/38; H04L 45/52;
(Continued)

(56) References Cited

U.S. PATENT DOCUMENTS 8,867,363 B2  10/2014 Mohapatra et al.
8,873,409 B2  10/2014 Filsfils et al.
(Continued)

OTHER PUBLICATIONS

"MPLS VPN Per VRF Label," Mar. 15, 2013, Cisco Systems, Inc., San Jose, CA (12 pages).
(Continued)

*Primary Examiner* — Alvin Zhu
(74) *Attorney, Agent, or Firm* — The Law Office of Kirk D. Williams

(57) ABSTRACT

In one embodiment, a provider edge packet switching device of a provider network is configured with different Internet Protocol (IP) forwarding information bases (FIBs) depending on whether the forwarding information base is associated with core-facing ingress packet traffic (e.g., packet traffic from the provider network) or customer-facing ingress packet traffic (e.g., packet traffic from a customer network). In the latter case of customer-facing ingress packet traffic, the customer-facing forwarding information base includes load balancing lookup results for load balancing traffic between a customer edge packet switching device and through the provider network. In the case of core-facing ingress packet traffic, the core-facing forwarding information base includes a lookup result for forwarding traffic to a customer edge packet switching device, and does not include the above-referenced load balancing lookup result information.

20 Claims, 5 Drawing Sheets

(51) Int. Cl.
*H04L 12/741* (2013.01)
*H04L 12/713* (2013.01)

(58) Field of Classification Search
CPC ....... H04L 45/586; H04L 45/60; H04L 45/72;
H04L 45/74; H04L 45/742; H04L 45/745;
H04L 47/12; H04L 47/122; H04L 47/125
See application file for complete search history.

(56) References Cited

U.S. PATENT DOCUMENTS

2008/0101368 A1* 5/2008 Weinman .............. H04L 45/306
370/392
2009/0274153 A1* 11/2009 Kuo ........................ H04L 45/74
370/392
2011/0255539 A1* 10/2011 Yumoto .................. H04L 45/00
370/392

OTHER PUBLICATIONS

Josef Ungerman, "Anatomy of Internet Routers," 2013, Cisco Systems, Inc., San Jose, CA (52 pages).
"BGP Multipath Load Sharing for Both eBGP and iBGP in an MPLS-VPN," Jun. 26, 2006, Cisco Systems, Inc., San Jose, CA (14 pages).
"eiBGP Multipath for Non-VRF Interfaces (IPv4/IPv6)," 2013, Cisco Systems, Inc., San Jose, CA (4 pages).
Multi-path eiBGP with per-VRF label allocation, 2007, Cisco Systems, Inc., San Jose, CA (9 pages).

* cited by examiner

DIFFERENT FORWARDING OF PACKETS BASED ON WHETHER RECEIVED FROM A CORE OR CUSTOMER NETWORK

TECHNICAL FIELD

The present disclosure relates generally to different forwarding of packets based on whether received from a core or customer network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
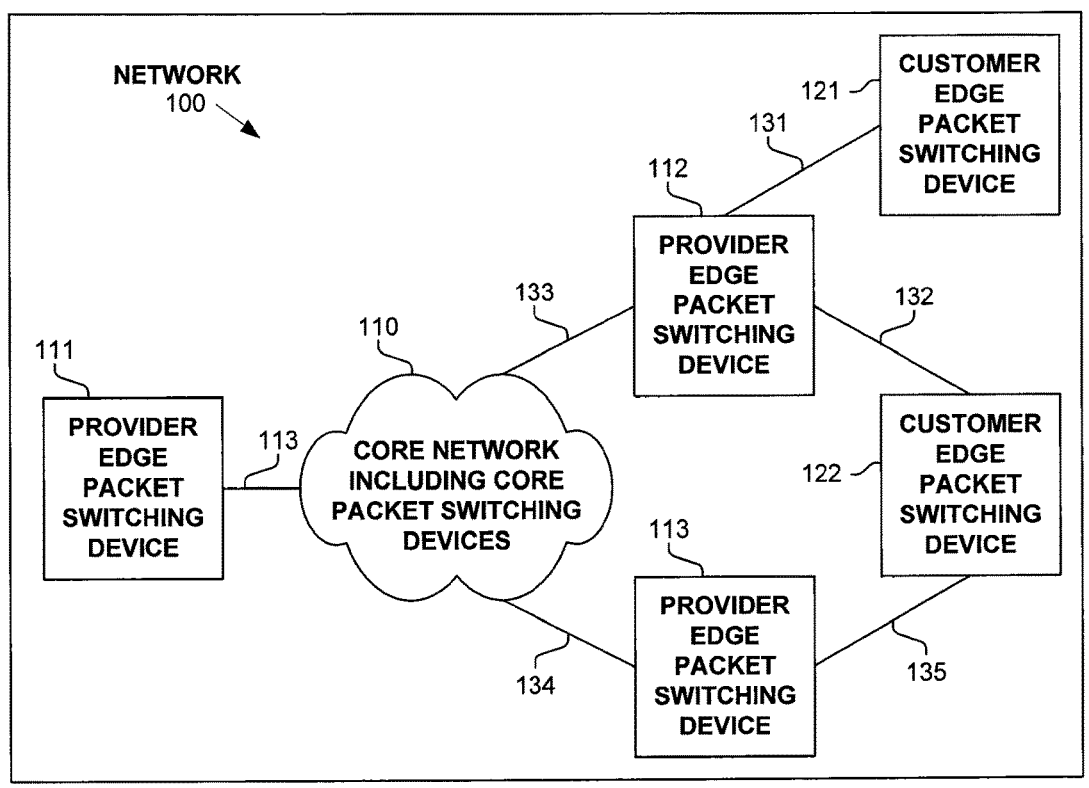
FIG. 1 illustrates a network operating according to one embodiment.

Disclosed are, inter alia, methods, apparatus, computer-storage media, mechanisms, and means associated with different forwarding of packets based on whether received from a core or customer network. One embodiment includes a packet switching device, comprising: a core-facing ingress interface and a core-facing egress interface each being communicatively coupled to a core network of a provider network; a first customer-facing ingress interface and a first customer-facing egress interface each being communicatively coupled to a first customer edge packet switching device of a customer network; a second customer-facing ingress interface and a second customer-facing egress interface each being communicatively coupled to a second customer edge packet switching device of the customer network; memory; and one or more processing elements.

In one embodiment, a customer-facing lookup entity is configured to perform lookup operations on customer-network Internet Protocol (IP) packets received on the first customer-facing ingress interface resulting in a determination of sending the customer-network IP packets to the second customer edge packet switching device by load balancing the customer-network received IP packets between the core network via the core-facing egress interface and the second customer edge packet switching device via the second customer-facing egress interface.

In one embodiment, a core-facing lookup entity configured to perform lookup operations on IP addresses of core-network IP packets received on the core-facing ingress interface resulting in a determination of sending the core-network IP packets to the second customer edge packet switching device via the second customer-facing egress interface. The core-facing lookup entity does not include load balancing information for load balancing the core-network IP packets.

In one embodiment, the packet switching device is a provider edge packet switching device of the provider network. In one embodiment, the core-network IP packets including native received IP packets, Multiprotocol Label Switching (MPLS) encapsulated IP packets, or both native received IP packets and MPLS encapsulated IP packets. In one embodiment, at least some of the core-network IP packets are received MPLS encapsulated IP packets. In one embodiment, said received MPLS encapsulated IP packets include a same per Virtual Private Network (VPN) routing and forwarding (VRF) label (same per VRF label).

2. Description

Disclosed are, inter alia, methods, apparatus, computer-storage media, mechanisms, and means associated with different forwarding of packets based on whether received from a core or customer network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes a packet switching device, comprising: a core-facing ingress interface and a core-facing egress interface configured to communicatively couple to a core network of a provider network (e.g., via one or more links); a first customer-facing ingress interface and a first customer-facing egress interface configured to communicatively couple to a first customer edge packet switching device of a customer network (e.g., via one or more links); a second customer-facing ingress interface and a second customer-facing egress interface each configured to communicatively couple to a second customer edge packet switching device of the customer network (e.g., via one or more links); one or more processing elements and memory; a customer-facing lookup entity configured to perform lookup operations on a plurality of customer-network Internet Protocol (IP) packets received on the first customer-facing ingress interface resulting in a determination of sending the plurality of customer-network IP packets to the second customer edge packet switching device by load balancing the plurality of customer-network received IP packets between the core network via the core-facing egress interface and the second customer edge packet switching device via the second customer-facing egress interface; and a core-facing lookup entity configured to perform lookup operations on IP addresses of a plurality of core-network IP packets received on the core-facing ingress interface resulting in a determination of sending the plurality of core-network IP packets to the second customer edge packet switching device via the second customer-facing egress interface, with the plurality of core-network IP packets including native received IP packets, Multiprotocol Label Switching (MPLS) encapsulated IP packets, or both native received IP packets and MPLS encapsulated IP packets, and wherein the core-facing lookup entity is not configured with load balancing information for load balancing the plurality of core-network IP packets.

FIG. 1 illustrates a network 100 operating according to one embodiment. As shown, network 100 includes a provider network with a core network 110 and provider edge packet switching devices 111-113. Network 100 also includes a customer network including customer edge packet switching devices 121-122. As used herein, the modifier "edge" when referring to an edge packet switching device signifies that the packet switching device is communicatively coupled to a next hop edge packet switching device of a different customer or provider network. For example, provider edge packet switching devices 112 and 113 are communicatively coupled to customer edge packet switching devices 121 and 122, respectively via single, multiple, or bundled links 131 and 135.

Furthermore depending on the one embodiment, one more of connections 113, 131, 132, 133, 134, and 135 is a single link, multiple links, link bundle, etc., which may include load balancing of traffic over one or more of these connections 113, 131, 132, 133, 134, and 135. Other links, packet switching devices, and host devices are not shown in FIG. 1.

In one embodiment of network 100, packets are communicated from customer edge packet switching device 121 to customer edge packet switching device 122. In order to offload traffic from link 132, provider edge packet switching device 112 load balances this packet traffic over link 132 and the path of link 133, core network 110, link 134, provider edge packet switching device 113, and link 135. However, if provider edge packet switching device 113 is also configured to load balance traffic being sent to customer edge device 122, a forwarding loop could be created because provider edge packet switching device 113 will load balance the packet traffic load balanced by provider edge device 112.

To avoid this forwarding loop, one embodiment configures its forwarding entities and forwarding information bases (FIBs) (e.g., data structures) differently depending on whether the lookup is being performed by a core-facing ingress entity (e.g., line card, network processor) or a customer-facing ingress entity. Additionally, the core-facing ingress entity does not include this load-balancing information, which results from more complex programming as ingress FIBs are not configured with the same forwarding information, but reduces the amount of storage required for the core-facing ingress FIB.

Moreover, additional state is not required to be part of an Internet Protocol (IP) lookup operation, such as, but not limited to whether, when performing the lookup operation on the IP destination address, an IP packet arrived encapsulated in a Multiprotocol Label Switching packet.

Figure 2A:
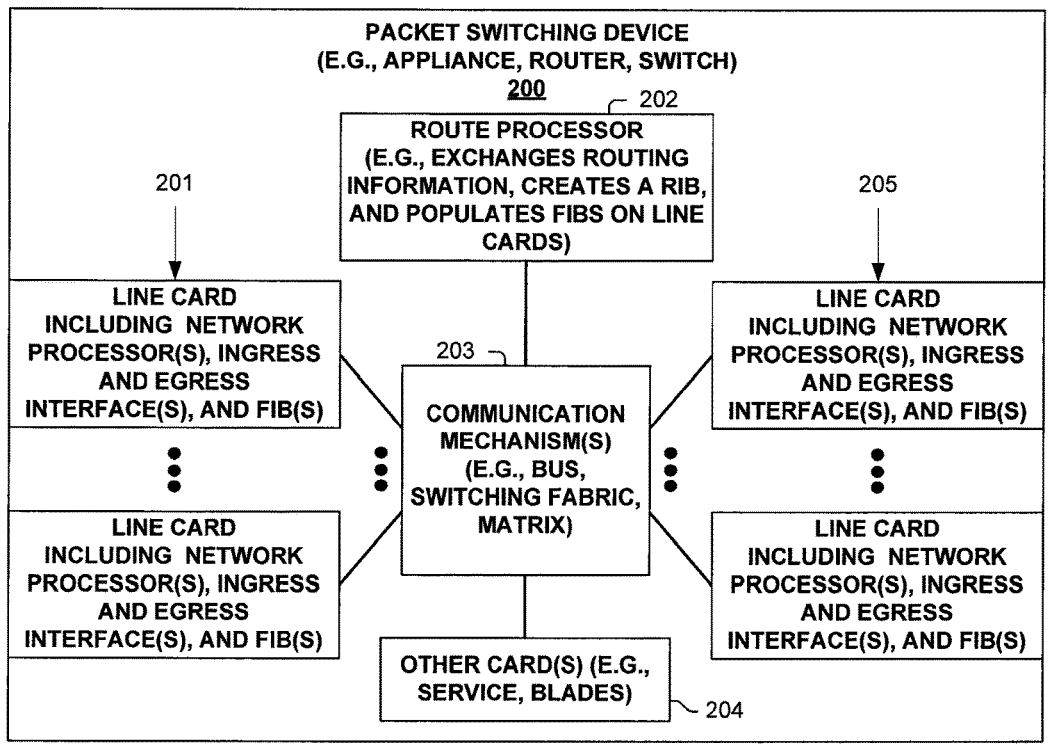
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with different forwarding of packets based on whether received from a core or customer network. Packet switching device 200 also has a control plane with one or more processing elements 202 for managing the control plane and/or control plane processing of packets associated different forwarding of packets based on whether received from a core or customer network. Packet switching device 200 also includes other cards 204 (e.g., service cards, blades) which include processing elements that are used in one embodiment to process packets associated with different forwarding of packets based on whether received from a core or customer network, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. The modifier "ingress" refers to packets that are received by packet switching device 200 on an interface of a line card 201, 205 from an external device. The modifier "ingress" refers to processing of packets that are received by packet switching device 200 on an interface of a line card 201, 205 from an external device. The modifier "egress" refers to processing of packets that are to be sent by packet switching device 200 from an interface of a line card 201, 205 to an external device.

In one embodiment, packet switching device 200 performs two-stage lookup operations consisting of an ingress lookup operation on an ingress line card and an egress lookup operation on an egress line card. In one embodiment, each of line cards 201, 205 perform ingress lookup operations on IP addresses in ingress forwarding information bases (FIBs) to determine how to ingress process packets, including determining which egress line card 201, 205 to which to communicate the packets. In one embodiment, each of line cards 201, 205 perform egress lookup operations on IP addresses in egress FIBs to determine how to egress process packets.

One embodiment differently configures ingress FIBs in line cards 201, 205 depending on whether they are either connected to an interface that is communicatively coupled to a core packet switching device (e.g., to a core-facing interface with the ingress lookup operation being performed by a core-facing lookup entity) or to a customer packet switching device (e.g., to a customer-facing interface with the ingress lookup operation being performed by a customer-facing lookup entity). The FIB of a customer-facing lookup entity includes load balancing information for sending traffic among different two or more paths to customer edge devices as discussed herein in relation to FIG. 1. The FIB of a core-facing lookup entity does not include this load balancing information, saving space. Therefore, a lookup operation on a same IP address of a customer device in this scenario in a customer-facing lookup entity will produce a load-balanced forwarding result, while in a core-facing lookup entity will produce forwarding result that does not load balance the traffic as discussed in relation to FIG. 1.

Figure 2B:
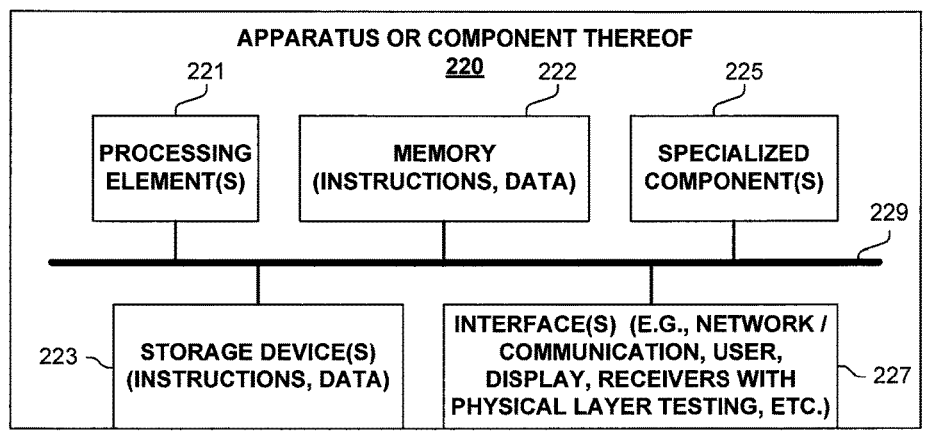
FIG. 2B illustrates an apparatus according to one embodiment.

FIG. 2B is a block diagram of an apparatus 220 used in one embodiment associated with different forwarding of packets based on whether received from a core or customer network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3:
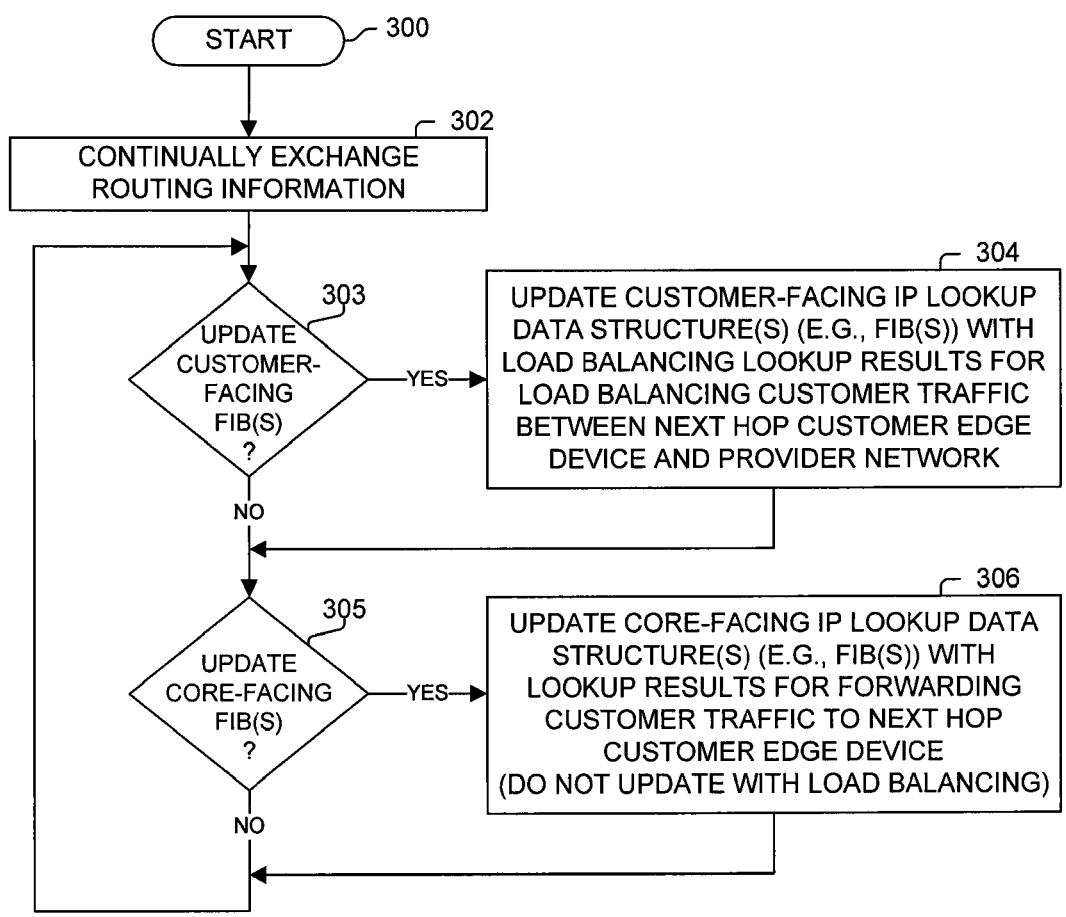
FIG. 3 illustrates a process according to one embodiment.

FIG. 3 illustrates a process used in one embodiment. Processing begins with process block 300. In process block 302, routing information is continually exchanged between packet switching devices.

As determined in process block 303, if one or more customer-facing ingress FIBs needs updating (which includes initial configuration), then processing proceeds to process block 304 then to process block 305; otherwise processing proceeds directly to process block 305. In process block 304, the customer-facing ingress FIB(s) (e.g., customer-facing IP lookup data structure(s)) are updated with load balancing lookup results for load balancing customer traffic between a next hop customer edge device and provider network.

As determined in process block 305, if one or more core-facing ingress FIBs needs updating (which includes initial configuration), then processing proceeds to process block 306 then to process block 303; otherwise processing proceeds directly to process block 303. In process block 306, the core-facing ingress FIB(s) (e.g., core-facing IP lookup data structure(s)) are updated with forwarding information to a next hop customer edge device. This forwarding information does not include load balancing lookup results for load balancing customer traffic between and provider network as discussed in relation to FIG. 1.

Figure 4A:
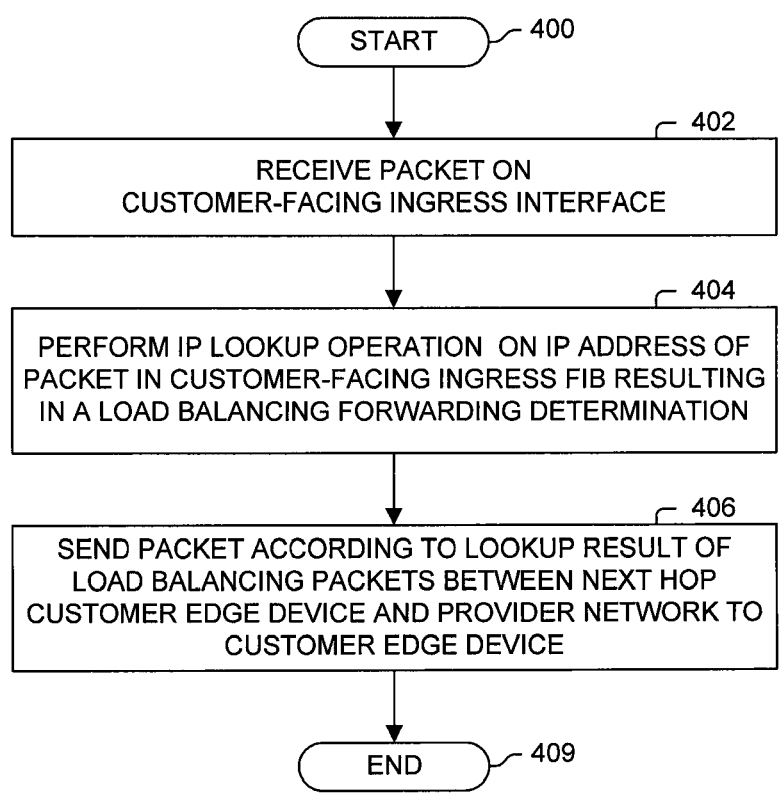
FIG. 4A illustrates a process according to one embodiment.

FIG. 4A illustrates a process performed in one embodiment. Processing begins with process block 400. In process block 402, a packet is received on a customer-facing ingress interface. In process block 404, an IP lookup operation is performed on the IP address of the received IP packet in a corresponding customer-facing ingress FIB by a customer-facing ingress lookup entity resulting in a load balancing forwarding determination such as that discussed in relation to FIG. 1. In process block 406, the IP packet is forwarded according to the lookup result of load balancing packets between a next hop customer edge packet switching device, and the provider network to the customer edge device. Processing of the flow diagram of FIG. 4A is complete as indicated by process block 409.

Figure 4B:
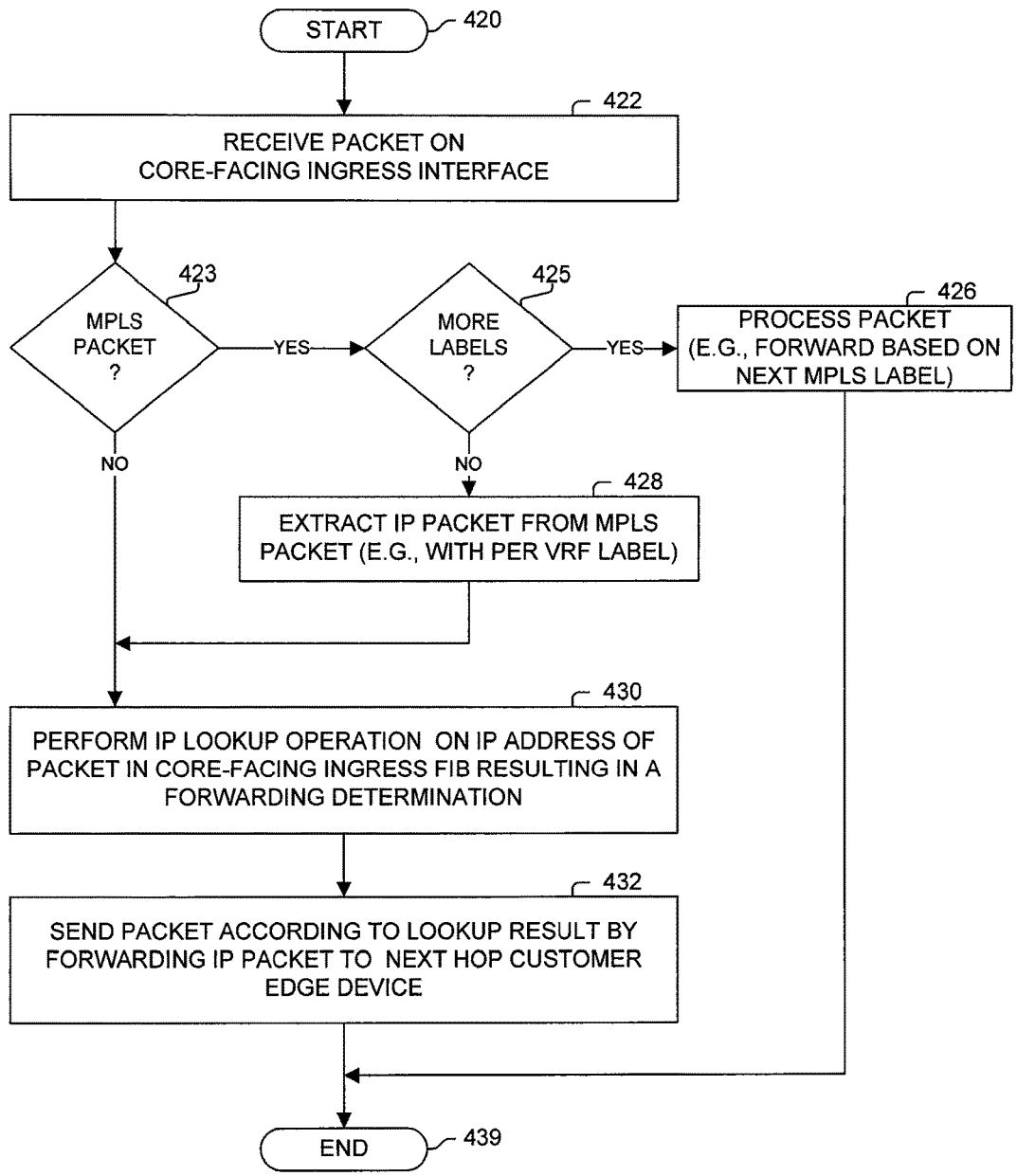
FIG. 4B illustrates a process according to one embodiment.

FIG. 4B illustrates a process performed in one embodiment. Processing begins with process block 420. In process block 422, a packet is received on a core-facing ingress interface. As determined in process block 423, if the packet is an MPLS packet, then processing proceeds to process block 425, otherwise to process block 430.

As determined in process block 425, if the packet has another label on which to forward the packet, the packet is forwarded according in process block 426; and processing proceeds to process block 439, wherein processing of the flow diagram of FIG. 4B is complete as indicated by process block 439.

Otherwise processing of process block 425 determined that there was not another label on which to forward the received packet and processing proceeded to process block 428. In process block 428, the IP packet is extracted from the received packet (e.g., an MPLS packet received with a per Virtual Private Network (VPN) routing and forwarding (VRF) label or "per VRF label" encapsulating the IP packet). Processing proceeds to process block 430

In process block 430, an IP lookup operation is performed on the IP address of the IP packet in a corresponding core-facing ingress FIB by a core-facing ingress lookup entity resulting in a forwarding determination such as that discussed in relation to FIG. 1. In process block 432, the IP packet is forwarded according to the lookup result by forwarding the IP packet to the next hop customer edge device. Processing of the flow diagram of FIG. 4B is complete as indicated by process block 439.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A packet switching device, comprising:
   a core-facing ingress interface and a core-facing egress interface configured to communicatively couple to a core network of a provider network;
   a first customer-facing ingress interface and a first customer-facing egress interface configured to communicatively couple to a first customer edge packet switching device of a customer network;
   a second customer-facing ingress interface and a second customer-facing egress interface each configured to communicatively couple to a second customer edge packet switching device of the customer network;
   one or more processing elements and memory;
   a customer-facing lookup entity configured to perform lookup operations on a plurality of customer-network Internet Protocol (IP) packets received on the first customer-facing ingress interface resulting in a determination of sending the plurality of customer-network IP packets to the second customer edge packet switching device by load balancing the plurality of customer-network received IP packets between the core network via the core-facing egress interface and the second customer edge packet switching device via the second customer-facing egress interface; and
   a core-facing lookup entity configured to perform lookup operations on IP addresses of a plurality of core-network IP packets received on the core-facing ingress interface resulting in a determination of sending the plurality of core-network IP packets to the second customer edge packet switching device via the second customer-facing egress interface, with the plurality of core-network IP packets including native received IP packets, Multiprotocol Label Switching (MPLS) encapsulated IP packets, or both native received IP packets and MPLS encapsulated IP packets, and wherein the core-facing lookup entity is not configured with load balancing information for load balancing the plurality of core-network IP packets.

2. The packet switching device of claim 1, where the packet switching device is a provider edge packet switching device of the provider network; and wherein the second customer edge packet switching device is communicatively coupled to a second provider edge packet switching device of the provider network, with the second provider edge packet switching device being communicatively coupled to the core network.

3. The packet switching device of claim 2, wherein at least two or more of the plurality of core-network IP packets are received MPLS encapsulated IP packets.

4. The packet switching device of claim 3, wherein said received MPLS encapsulated IP packets include a same per Virtual Private Network (VPN) routing and forwarding (VRF) label (same per VRF label).

5. The packet switching device of claim 2, wherein said received MPLS encapsulated IP packets include a same per Virtual Private Network (VPN) routing and forwarding (VRF) label (same per VRF label).

6. The packet switching device of claim 1, wherein said received MPLS encapsulated IP packets include a same per Virtual Private Network (VPN) routing and forwarding (VRF) label (same per VRF label).

7. The packet switching device of claim 1, wherein at least two or more of the plurality of core-network IP packets are received MPLS encapsulated IP packets.

8. The packet switching device of claim 7, wherein said received MPLS encapsulated IP packets include a same per Virtual Private Network (VPN) routing and forwarding (VRF) label (same per VRF label).

9. A method, comprising:
   performing operations by a first provider edge packet switching device communicatively coupled between a core network of a provider network and a first customer edge packet switching device of a customer network and between the core network and a second customer edge packet switching device of the customer network, wherein said operations include:
   for a plurality of customer-network Internet Protocol (IP) packets received from the first customer edge packet switching device and addressed to be forwarded to the second customer edge packet switching device, performing a lookup operation on IP addresses of the plurality of customer-network IP packets in a customer-facing IP forwarding data structure resulting in a determination of sending the plurality of customer-network IP packets to the second customer edge packet switching device by load balancing the plurality of customer-network IP packets between sending directly to the second customer edge packet switching device and sending to the second customer edge packet switching device via the core network and accordingly sending the plurality of customer-network IP packets to the second customer edge packet switching device;
   for a plurality of core-network IP packets received from the core network and addressed to be forwarded to the second customer edge packet switching device, performing a lookup operation on IP addresses of the plurality of core-network IP packets in a core-facing IP forwarding data structure resulting in a determination of sending the plurality of core-network IP packets directly to the second customer edge packet switching device and not via the core network, with the plurality of core-network IP packets including native received IP packets, Multiprotocol Label Switching (MPLS) encapsulated IP packets, or both native received IP packets and MPLS encapsulated IP packets; wherein the core-facing IP forwarding data structure does not include load balancing information for load balancing the plurality of core-network IP packets destined for the second customer edge packet switching device.

10. The method of claim 9, wherein the second customer edge packet switching device is communicatively coupled to a second provider edge packet switching device of the provider network, with the second provider edge packet switching device being communicatively coupled to the core network.

11. The method of claim 10, wherein at least two or more of the plurality of core-network IP packets are received MPLS encapsulated IP packets.

12. The method of claim 11, wherein said received MPLS encapsulated IP packets include a same per Virtual Private Network (VPN) routing and forwarding (VRF) label (same per VRF label).

13. The method of claim 10, wherein said received MPLS encapsulated IP packets include a same per Virtual Private Network (VPN) routing and forwarding (VRF) label (same per VRF label).

14. The method of claim 9, wherein said received MPLS encapsulated IP packets include a same per Virtual Private Network (VPN) routing and forwarding (VRF) label (same per VRF label).

15. The method of claim 9, wherein at least two or more of the plurality of core-network IP packets are received MPLS encapsulated IP packets.

16. The method of claim 15, wherein said received MPLS encapsulated IP packets include a same per Virtual Private Network (VPN) routing and forwarding (VRF) label (same per VRF label).

17. A method, comprising:
performing operations by a first provider edge packet switching device communicatively coupled to a core network via a core-facing ingress interface and a core-facing egress interface, with the first provider edge packet switching device communicatively coupled to a first customer edge packet switching device of a customer network via a first customer-facing ingress interface and a first customer-facing egress interface, with the first provider edge packet switching device communicatively coupled to a second customer edge packet switching device of a customer network via a second customer-facing ingress interface and a second customer-facing egress interface, and with the second customer edge packet switching device communicatively coupled to the core network via a second provider edge packet switching device; wherein said operations include:
for each first Multiprotocol Label Switching (MPLS) packet of a plurality of MPLS packets having a label corresponding to the customer network: receiving said first MPLS packet on the core-facing ingress interface, extracting a first Internet Protocol (IP) packet from said first MPLS packet, performing a core-facing ingress lookup operation on a destination address of said first IP packet in a first core-facing IP forwarding data structure with a lookup result of forwarding only via the second customer-facing egress interface, sending said first IP packet through the first provider edge packet switching device to the second customer-facing egress interface, and forwarding said first IP packet from the second customer-facing egress interface towards the second customer edge packet switching device; and
for a plurality of second IP packets of a stream of second IP packets each having an IP destination address corresponding to sending to the second customer edge packet switching device: receiving said second IP packets on the first customer-facing ingress interface, performing customer-facing ingress lookup operations on destination addresses of the plurality of second IP packets in a first customer-facing IP forwarding data structure resulting in a determination of load balancing via the first customer edge packet switching device and through the core network to the second provider edge packet switching device, load-balancing sending the plurality of second IP packets through the packet switching device to (a) the second customer-facing egress interface and forwarding corresponding second IP packets of plurality of second IP packets from second customer-facing egress interface towards the second customer edge packet switching device and (b) core-facing egress interface and forwarding corresponding second IP packets of plurality of second IP packets from first core-facing egress interface towards the second provider edge packet switching device;
wherein the first core-facing IP forwarding data structure and the first customer-facing IP forwarding data structure are programmed differently to accomplish said different IP lookup results with the first core-facing IP forwarding data structure not including load balancing information for load balancing IP packets destined for the second customer edge packet switching device.

18. The method of claim 17, comprising: for each first native IP packet of a plurality of native IP packets: receiving said first native IP packet on the core-facing ingress interface, performing a core-facing ingress lookup operation on a destination address of said first native IP packet in a first core-facing IP forwarding data structure with a lookup result of forwarding only via the second customer-facing egress interface, sending said first native IP packet through the first provider edge packet switching device to the second customer-facing egress interface, and forwarding said first native IP packet from the second customer-facing egress interface towards the second customer edge packet switching device.

19. The method of claim 18, wherein each of the plurality of MPLS packets include a same per Virtual Private Network (VPN) routing and forwarding (VRF) label (same per VRF label).

20. The method of claim 17, wherein each of the plurality of MPLS packets include a same per Virtual Private Network (VPN) routing and forwarding (VRF) label (same per VRF label).

* * * * *